United States Patent Office 2,842,552
Patented July 8, 1958

2,842,552

PROCEDURES FOR THE PREPARATION OF THE LEUCO SULFURIC ESTERS OF VAT DYESTUFFS

Chris C. Schulze, Albany, N. Y., Ben H. Kirby, Pittsburgh, Pa., and Robert E. Brouillard, Westfield, N. J., assignors to General Aniline & Film Corporation, New York, N. Y., a corporation of Delaware No Drawing. Application June 24, 1955
Serial No. 517,945

7 Claims. (Cl. 260—303)

This invention relates to an improved process for the manufacture of leuco sulfuric ester salts of vat dyestuffs.

For preparation of these compounds, it is known to effect reduction of a vat dyestuff and formation of its sulfuric acid ester in the presence of a tertiary nitrogen base, especially pyridine, its homologs, mixtures thereof, or dimethylaniline. These tertiary nitrogen bases first form a complex addition product with the esterifying or sulfatation reagent (e. g., chlorosulfonic acid, oleum, or sulfur trioxide). The vat dye, together with a reducing metal, such as iron or copper, is added to the resulting mixture and reduction and esterification (i. e., sulfatation) take place concurrently, yielding the sulfuric ester of the leuco vat dye.

In recovering the vat dye leuco sulfuric ester, the resulting reaction mixture is drowned in water containing enough alkaline reagent such as sodium or potassium carbonate to neutralize acids and excess sulfatation reagent contained in the mixture, and to convert the vat dye leuco sulfuric ester to the corresponding sulfuric ester salt. The tertiary nitrogen bases thereby liberated are recovered from the aqueous mixture by vacuum distillation, and the distilland residue is diluted with sufficient water to dissolve the vat dye leuco ester salt. After filtering to remove sludge formed by reducing metal compounds, the vat dye leuco sulfuric ester salt is salted out and separated, e. g., by filtration.

The aforesaid procedure affords yields which seldom exceed 80% of theory and are often as low as 60% of theory. In the case of leuco sulfuric ester salts of relatively low solubility in water, it is necessary, in order to maintain the volume of the solution within reasonable bounds, to remove most of the water-soluble inorganic salts before effecting filtration from the reducing metal sludge. This is ordinarily effected by chilling the residual distilland, after vacuum distillation of tertiary nitrogen base, to effect precipitation of the vat dye leuco ester. The mixture is filtered, yielding a filter cake containing the sludge together with the vat dye leuco ester salt, and the filter cake is reslurried with water while raising the temperature to dissolve the vat dye leuco ester. The mixture is again filtered to separate the water-insoluble reducing metal sludge. Handling of relatively large volumes of liquid and/or subjecting the solutions to an additional filtration step, involved in this procedure, materially increase the cost of the product.

We have discovered an improvement in the aforesaid process, utilizing a water-soluble tertiary nitrogen base, whereby the yields of the vat dye leuco sulfuric ester salts are increased by 10 to 40%, and in the case of vat dye leuco esters of relatively low solubility in water, necessity for multiple filtration is avoided. The improvement in accordance with our invention involves heating the drowned esterification mixture to a temperature at which the vat dye leuco sulfuric ester salt is completely dissolved, while maintaining the concentration of the water-soluble tertiary nitrogen base at 10 to 30% of the mixture and the dyestuff concentration (in terms of unreduced vat dye) at a value ranging up to 5% of the mixture, e. g., 1.5 to 4%, and filtering the mixture to remove the sludge of insoluble reducing metal compounds. Tertiary nitrogen bases are then separated by distillation in the usual manner from the filtrate, and the vat dye leuco sulfuric ester salt is recovered by salting out and separating from the mixture, e. g., by filtering.

The temperatures required to effect complete dissolution of vat dye leuco sulfuric ester salts in drowned reaction mixtures in accordance with this invention do not ordinarily exceed 65° C. To obtain high yields in accordance with our improved process, it is necessary, however, to avoid prolonged maintenance of the drowned reaction mixture at elevated temperatures which may be required for complete dissolution of the vat dye leuco sulfuric ester salt. Namely, the leuco sulfuric ester salt slowly decomposes in the presence of the aqueous tertiary nitrogen base solution, especially at temperatures of 60° C. or more, and if allowed to proceed for longer periods, such decomposition seriously reduces the yield. In commercial operation, filtration of the drowned reaction mixture may require 1 to 8 hours, and this is sufficient to lower the yield considerably.

We have further discovered, however, that vat dye leuco sulfuric ester salts can be stabilized against such decomposition in the aqueous tertiary nitrogen base medium of the drowned esterification mixture, even at temperatures up to 70° C. This is accomplished by including in the mixture at least 1% (and preferably 1 to 5%) of a hydrocarbon sulfonate of the benzene series, especially a benzene or naphthalene hydrocarbon mono- or disulfonate, or a lower alkylolamine (e. g. mono-, di-, or triethanolamine) wherein the alkylol groups contain 2 to 3 carbon atoms, or mixtures of such alkylolamines with the aforesaid sulfonates, such mixtures being, if desired, alkylolamine salts of said sulfonates.

The aforesaid compounds act as stabilizers and solubilizers, not only inhibiting decomposition of the vat dye leuco sulfuric ester during filtration of the drowned esterification mixture, but also increasing the solubility of the vat dye leuco sulfuric ester salt in the mixture. It is, therefore, possible to maintain the leuco ester salt entirely in solution at considerably lower temperatures than 60 to 65° C. as, for example, temperatures of the order of 25 to 40° C. Maintenance of such lower temperatures further increases the stability of the vat dye leuco sulfuric ester salt and safeguards it against decomposition.

Our invention will be more fully understood from the following examples, wherein parts and percentages are by weight.

*Example 1*

1.4 parts of cuprous chloride are added to a mixture of 120 parts of chlorosulfonic acid with 540 parts of anhydrous pyridine at a temperature of 30° C. 60 parts of dimethyldichlorothioindigo (a pink vat dye) are added to the mixture. While agitating at 30° C. in a non-oxidizing atmosphere (e. g., nitrogen or carbon dioxide), 30.4 parts of iron powder are gradually added, maintaining the temperature not higher than 55° C., and reduction allowed to proceed at 52–55° C. for three hours. The resulting mixture is drowned in a solution of 75 parts of naphthalene-1,5-disulfonic acid, 190 parts of sodium carbonate, and 30 parts of 46° Bé. caustic soda in 1600 parts of water. The drowned mixture is filtered at 35–40° C., and the filter cake, consisting mainly of iron hydroxide, is washed with aqueous 2% sodium carbonate until the washings are free of vat dye leuco ester salt. Combined filtrate and washings are diluted with water to 2800 parts, and pyridine is removed by distillation at reduced pressure, at a temperature not exceeding 35° C. The distilland is diluted with water to 3200 parts, and the vat dye leuco ester salt is salted out by adding 25 parts of sodium chloride. The dyestuff is recovered as a filter cake, and is dried and standardized in the usual manner.

The yield amounts to 91 to 94% of theory.

Instead of pyridine, an equal amount of α-picoline or a mixture of pyridine and α-picoline can be used to obtain the same results.

Similar results are also obtained upon substituting 50 parts of triethanolamine for the 70 parts of naphthalene disulfonic acid of this example.

*Example 2*

45 parts of an anthrimidobenzanthrone olive green vat dye are added to a mixture of 72 parts of chlorosulfonic acid with 400 parts of a mixture of pyridine and α-picoline, at 25 to 30° C. After establishing an inert atmosphere of nitrogen or carbon dioxide, 12 parts of iron powder are added, and the temperature held at 30 to 40° C. for 6 to 12 hours. The reaction mixture is drowned in a solution in 2000 parts of water of 100 parts of sodium carbonate, 44 parts of monosulfonated xylene, and 15 parts of 46° Bé. caustic soda. The solution is heated to 35° C., filtered to remove insoluble metal salts or hydroxides, and the filtrate subjected to vacuum distillation to remove the nitrogen bases. The distilland is diluted with water to 2500 parts, and 190 parts of sodium chloride and 5 parts of 46° Bé. caustic soda are added to salt out the vat dye leuco ester salt, which is filtered out and dried. A yield of 94 to 97% of theory is obtained.

Instead of the mixture of pyridine bases employed herein, pyridine alone or α-picoline alone can be used to obtain the same results. Likewise, upon replacing the xylene monosulfonate with an equal amount of triethanolamine, similar results are obtained.

Omission of xylene sulfonate as well as triethanolamine in this example renders the vat dye leuco sulfuric ester salt incompletely soluble in the drowning mixture, unless the temperature is raised to 55 to 60° C. At such temperatures, decomposition of the leuco ester salt occurs during a period of one hour required for filtering out the metal hydroxides, such that the yield obtained is reduced to 78–81% of theory. In the presence of xylene monosulfonate or triethanolamine as employed in this example, no appreciable loss in yield of leuco sulfuric ester salt occurs when the drowned reduction mixture is held at 35° C. for 72 hours, nor at 55–60° C. for 8 hours.

*Example 3*

52.5 parts of anthraquinone bis-phenylthiazole (a yellow vat dyestuff) and 0.5 part cuprous chloride are added to a mixture of 51 parts of chlorosulfonic acid with 315 parts of pyridine (or α-picoline, or a mixture thereof with pyridine). While maintaining the mixture under an inert atmosphere, 15.7 parts of iron powder are added and esterification is allowed to proceed for 4 hours at 35–40° C. The mixture is drowned in a solution in 900 parts of water, of 17 parts of naphthalene-1,5-disulfonic acid, 20 parts of triethanolamine, and 100 parts of sodium carbonate. The drowned mixture is heated to 40° C., filtered, and the iron sludge filter cake is washed with aqueous 5% sodium carbonate. The pyridine base is distilled from the combined filtrate and washings and the residual distilland diluted to 3000 parts with water. 375 parts of sodium chloride are added, and the precipitated vat dye leuco sulfuric ester salt is recovered by filtration and dried. A yield of 87–92% of theory is obtained.

Xylene monosulfonate, triethanolamine, m-benzene-disodium sulfonate or a mixture of triethanolamine with benzene m-disulfonic acid can be substituted with similar results for the mixture of triethanolamine and naphthalene-1,5-disulfonic acid of this example.

*Example 4*

To a mixture of 89 parts of chlorosulfonic acid with 510 parts of pyridine (or α-picoline or a mixture thereof with pyridine), there are added 0.5 part of cuprous chloride and 50 parts of 1,2,1′,2′-naphthioindigo (a brown vat dyestuff). 31.6 parts of iron powder are added while maintaining the mixture under an inert atmosphere, and reduction and esterification are effected at 50–55° C. for 3 hours. The mixture is then drowned in a solution in 2000 parts of water of 43.3 parts of naphthalene-1,5-disulfonic acid, 24 parts of aqueous 46° Bé. caustic soda, and 185 parts of sodium carbonate. The mixture is heated to 35–40° C., filtered, and the iron sludge washed with aqueous 1% sodium carbonate solution. The pyridine base is removed by vacuum distillation from the filtrate, and the residue of the latter is diluted to 3200 parts with water. 64 parts of sodium chloride are added to salt out the vat dye leuco sulfuric ester salt which, on filtering out and drying, is recovered in a yield of 95–99% of theory.

Similar results are obtained by substituting triethanolamine for the sodium salt of naphthalene-1,5-disulfonic acid formed in the drowned reaction mixture.

In view of the insoluble nature of the vat dye leuco sulfuric ester salt of this example, omission of the stabilizing and solubilizing components (the naphthalene-1,5-disulfonate or triethanolamine) results in the necessity of first separating the leuco ester salt together with the iron sludge, by filtration from the drowned and chilled reaction mixture, resludging the filter cake with water, and again filtering to remove iron sludge, in order to avoid handling excessive volumes of solution in a single filtration step. The initial filtration is eliminated in the procedure of this example by use of the stabilizing compounds in accordance with the invention.

*Example 5*

To a mixture of 75 parts of chlorosulfonic acid and 375 parts of pyridine (or a mixture thereof with α-picoline) there are added 50 parts of dibenzopyrenequinone (an orange vat dyestuff) at a temperature of 35–40° C. While maintaining the mixture under an inert atmosphere, 21.8 parts of iron powder are added and reduction and esterification carried out at 40–60° C. for 3 hours. The resulting mixture is drowned in a solution, in 835 parts of water, of 26 parts of naphthalene-1,5-disulfonic acid, 14.4 parts of aqueous 46° Bé. caustic soda solution, and 103 parts of sodium carbonate. The mixture is heated to 35° C., filtered, and the filter cake washed with aqueous 2% sodium carbonate solution. Aqueous pyridine bases are distilled from the combined filtrates, and the residue is diluted to 2100 parts with water. The vat dye leuco sulfuric ester salt is salted out with 225 parts of sodium chloride, recovered by filtration, and dried in the usual manner. A yield of 96–99% of theory is obtained.

As in the preceding example, a mixture of naphthalene-1,5-disulfonic acid with triethanolamine, or triethanolamine itself, or xylene monosulfonate, can be substituted for the naphthalene-1,5-disulfonic acid sodium salt of this example to obtain similar results.

The vat dye leuco sulfuric ester salt of this example is relatively difficultly soluble in water, and, in this case as in the preceding example, a resludging operation to permit separation by filtration of the iron sludge from the reduction is avoided by inclusion of the stabilizers of this invention.

*Example 6*

To a mixture of 54 parts of chlorosulfonic acid and 270 parts of pyridine (or α-picoline, or a mixture thereof with pyridine) are added 56 parts of tetrabromoindigo. While maintaining an inert atmosphere, 29.9 parts of iron are gradually added and reduction and esterification effected at temperatures of 40–50° C. for a period of 3 hours. The reaction mixture is drowned in a solution in 950 parts of water of 100 parts of sodium carbonate and 30 parts of triethanolamine. The mixture is heated to 35° C., filtered, and the filter cake of iron compounds washed with aqueous 2% sodium carbonate solution. Aqueous pyridine bases are removed by vacuum distillation from the combined filtrates and residue is diluted to 1400 parts by addition of water. The vat dye leuco sulfonic ester salt is salted out by adding 112 parts of sodium sulfate to 12 parts of 46° Bé. caustic soda solution. After filtering and drying the product, a yield is obtained of 95–98% of theory.

By applying the procedure of this example to other anthraquinonoid vat dyestuffs, similarly high yields are obtained. Thus, in the case of dimethoxy-dibenzanthrone, a yield of 93–95% of theory is obtained; in the case of dibromo-dibenzopyrene-quinone, a yield of 90–92% is obtained; and in the case of N,N'-diethyl-dipyrazolanthronyl, a yield of 92–96% of theory is obtained.

Variations which will be obvious to those skilled in the art can be made in the foregoing examples without departing from the scope or spirit of the invention.

We claim:

1. In a process for the preparation of a leuco sulfuric ester salt of a vat dyestuff, involving reduction and esterification of the vat dye by reaction with a sulfatation reagent and a reducing metal in a water-soluble tertiary nitrogen base, and drowning the resulting reaction mixture in an aqueous alkaline solution, the improvement which comprises adjusting the amount of water in the drowning mixture to yield a final concentration of tertiary nitrogen base of 10–30% and of the dyestuff, a concentration corresponding to up to 5% of equivalent unreduced vat dye, including in the drowning mixture as a stabilizer a quantity of a hydrocarbon sulfonate of the benzene series sufficient to yield a final concentration thereof in said mixture of 1% to 5%, maintaining the temperature of the drowned mixture at a value not substantially above 40° C., at which the vat dye leuco sulfuric ester salt is completely dissolved, filtering the mixture, and recovering tertiary nitrogen base and vat dye leuco sulfuric ester salt from the filtrate.

2. Process as defined in claim 1, wherein said hydrocarbon sulfonate is a benzene series hydrocarbon sulfonic acid salt of a lower alkylolamine in which the alkylol groups contain 2 to 3 carbon atoms.

3. A process as defined in claim 1 wherein there is included in the drowned reaction mixture during filtration thereof, 1–5% of a lower alkylolamine in which the alkylol groups contain 2 to 3 carbon atoms as a stabilizer.

4. A process as defined in claim 1 wherein the concentration of the vat dye leuco sulfuric ester salt in the drowned reaction mixture corresponds to 1.5–4% of equivalent vat dye, said tertiary nitrogen base is a water-soluble pyridine base and said stabilizer is a naphthalene 1,5-disulfonate, said tertiary nitrogen base being recovered by distillation and said vat dye leuco sulfuric ester salt, by salting out, from the filtered drowned reaction mixture.

5. A process as defined in claim 1 wherein the concentration of the vat dye leuco sulfuric acid ester salt in the drowned reaction mixture corresponds to 1.5–4% of equivalent vat dye, said tertiary nitrogen base is a water-soluble pyridine base and said stabilizer is a xylene monosulfonate, said tertiary nitrogen base being recovered by distillation and said vat dye leuco sulfuric ester salt, by salting out, from the filtered drowned reaction mixture.

6. A process as defined in claim 3 wherein the concentration of the vat dye leuco sulfuric acid ester salt in the drowned reaction mixture corresponds to 1.5–4% of equivalent vat dye, said tertiary nitrogen base is a water-soluble pyridine base and said stabilizer is triethanolamine, said tertiary nitrogen base being recovered by distillation and said vat dye leuco sulfuric ester salt, by salting out, from the filtered drowned reaction mixture.

7. A process as defined in claim 2 wherein the concentration of the vat dye leuco sulfuric acid ester salt in the drowned reaction mixture corresponds to 1.5–4% of equivalent vat dye, said tertiary nitrogen base is a water-soluble pyridine base and said stabilizer is the triethanolamine salt of naphthalene 1,5-disulfonic acid, said tertiary nitrogen base being recovered by distillation and said vat dye leuco sulfuric ester salt, by salting out, from the filtered drowned reaction mixture.

References Cited in the file of this patent

UNITED STATES PATENTS

| | | |
|---|---|---|
| 1,879,028 | Bauer et al. | Sept. 27, 1932 |
| 1,895,336 | Morten et al. | Jan. 24, 1933 |
| 1,895,382 | Harris | Jan. 24, 1933 |
| 1,929,912 | Barnes | Oct. 10, 1933 |
| 1,934,143 | Ratti | Nov. 7, 1933 |
| 2,506,580 | Coffey et al. | May 9, 1950 |
| 2,553,475 | Robson et al. | May 15, 1951 |

FOREIGN PATENTS

| | | |
|---|---|---|
| 781,350 | France | May 13, 1935 |
| 564,115 | Germany | Nov. 14, 1932 |
| 476,298 | Great Britain | Dec. 2, 1937 |
| 277,398 | Great Britain | Sept. 9, 1927 |
| 276,023 | Great Britain | Aug. 16, 1926 |
| 295,716 | Great Britain | Aug. 19, 1927 |